United States Patent
Irie

(10) Patent No.: US 9,906,178 B2
(45) Date of Patent: Feb. 27, 2018

(54) CONTROL APPARATUS FOR MOTOR

(71) Applicant: DENSO CORPORATION, Kariya, Aichi-pref. (JP)

(72) Inventor: Koji Irie, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/341,603

(22) Filed: Nov. 2, 2016

(65) Prior Publication Data
US 2017/0126162 A1    May 4, 2017

(30) Foreign Application Priority Data
Nov. 2, 2015   (JP) .................................. 2015-215437

(51) Int. Cl.
*H02P 1/04* (2006.01)
*H02P 21/20* (2016.01)
*H02P 27/08* (2006.01)

(52) U.S. Cl.
CPC ............ *H02P 21/20* (2016.02); *H02P 27/085* (2013.01)

(58) Field of Classification Search
CPC ........ H02P 29/032; H02P 23/04; H02P 27/08; H02P 2209/13; H02M 7/5395
See application file for complete search history.

(56) References Cited

U.S. PATENT DOCUMENTS

2010/0231151 A1*  9/2010  Ohtani .............. H02M 7/53875
                                                                318/400.09

FOREIGN PATENT DOCUMENTS

JP        2015-012662 A      1/2015

* cited by examiner

*Primary Examiner* — Karen Masih
(74) *Attorney, Agent, or Firm* — Oliff PLC

(57) ABSTRACT

A control apparatus operates an inverter by overmodulation pulse width modulation control or rectangular wave control to control an output torque of a motor to a command torque. When a first condition is not met, the inverter is operated by the overmodulation pulse width modulation control. The first condition is that an amplitude parameter increases and reaches a determination value. The amplitude parameter is an amplitude of an output voltage vector of the inverter or a modulation factor of the output voltage of the inverter. When the first condition and a second condition are met, operation of the inverter is switched from operation by the overmodulation pulse width modulation control to operation by the rectangular wave control. The second condition is that a change amount in a negative d-axis direction of a current vector of current flowing to the motor after the first condition is met reaches a predetermined amount.

14 Claims, 13 Drawing Sheets

RELATED TECHNOLOGY

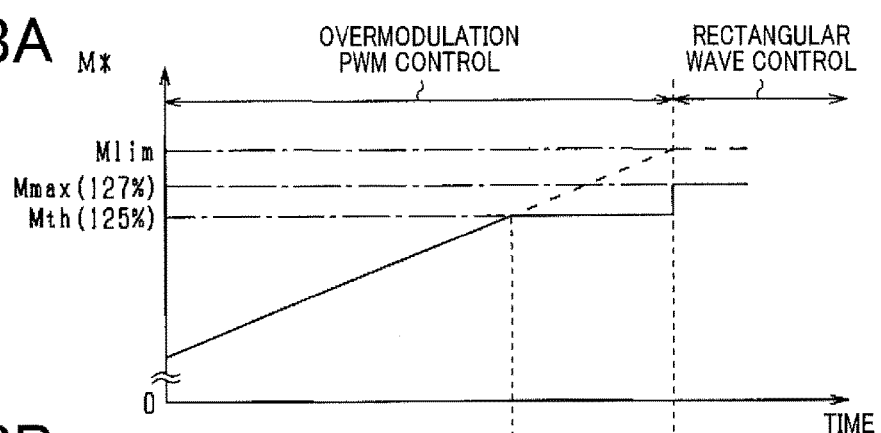
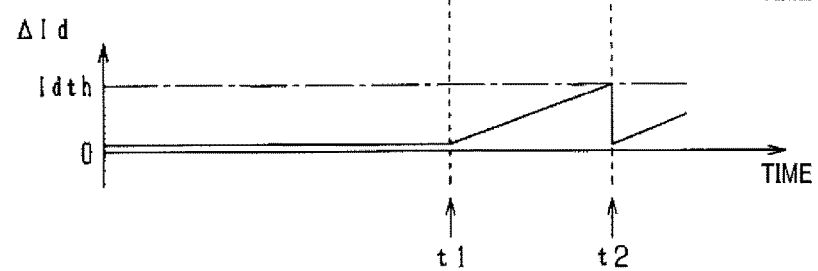

RELATED TECHNOLOGY

Mnf<Mth

- Mnf≧Mth
- ΔIλ<Iλth

- Mnf≧Mth
- ΔIλ≧Iλth

CONTROL APPARATUS FOR MOTOR

CROSS-REFERENCE TO RELATED APPLICATION

This application is based on and claims the benefit of priority from Japanese Patent Application No. 2015-215437, filed Nov. 2, 2015. The entire disclosure of the above application is incorporated herein by reference.

BACKGROUND

Technical Field

The present disclosure relates to a control apparatus for a motor that is driven by an alternating-current voltage outputted from an inverter.

Related Art

As this type of control apparatus, a control apparatus is known in which an output torque of a motor is controlled to a command torque by an inverter being operated based on overmodulation pulse width modulation (PWM) control or 180-degree rectangular wave control. In overmodulation PWM control, both amplitude and phase of an output voltage vector of the inverter can be controlled. Meanwhile, in 180-degree rectangular wave control, the output voltage of the inverter is fixed at a maximum value thereof. Therefore, only the phase of the output voltage vector is a manipulated variable.

Here, a significant difference is present between the maximum voltage that can be outputted from the inverter under overmodulation PWM control and the voltage outputted from the inverter under 180-degree rectangular wave control. As a result of this difference, there is a voltage range that cannot be outputted from the inverter. Thus, there is a current range that is unattainable when a current vector of the current flowing to the motor is in a steady state. When a command current vector corresponding to the command torque is included in the unattainable current range, a hunting phenomenon occurs. In the hunting phenomenon, control mode is frequently switched between overmodulation PWM control and 180-degree rectangular wave control. Consequently, torque fluctuations occur in the motor. Therefore, switchover conditions for switching the control mode from overmodulation PWM control to 180-degree rectangular wave control, and from 180-degree rectangular wave control to overmodulation PWM control, are required to be appropriately set.

Here, in JP-A-2015-12662, less-than-180-degree rectangular wave control is provided between overmodulation PWM control and 180-degree rectangular wave control. In addition, in JP-A-2015-12662, when the control mode is switched from 180-degree rectangular wave control to overmodulation PWM control, through less-than-180-degree rectangular wave control, a condition that a comparison is performed between the current vector and a threshold thereof, or a condition that a comparison is performed between a d-axis current flowing to the motor and a threshold thereof is provided. As a result, occurrence of the hunting phenomenon is suppressed.

Here, to reliably prevent the occurrence of the hunting phenomenon, setting the above-described threshold so as to have a large margin in relation to an operation line of the command current vector can also be considered. However, in this case, a problem arises in that current fluctuations in the motor that occur when the control mode is switched from rectangular wave control to overmodulation PWM control increase. In this way, there is still room for improvement in techniques for suppressing the occurrence of the hunting phenomenon.

SUMMARY

In is thus desired to provide a control apparatus for a motor that is capable of suppressing occurrence of a hunting phenomenon, while suppressing current fluctuations in the motor that occur during switchover of control mode.

Means for solving the above-described problem and working effects thereof are described below.

An exemplary embodiment provides a control apparatus for a motor that is applied to a motor control system that includes an inverter that converts an output voltage of a direct-current power supply to an alternating-current voltage and outputs the alternating-current voltage, and a motor that is driven by the alternating-current voltage outputted from the inverter. The control apparatus includes an overmodulation operating unit, a rectangular wave operating unit, and a switching unit. The overmodulation operating unit operates the inverter by overmodulation PWM control to control an output torque of the motor to a command torque.

The rectangular wave operating unit operates the inverter by rectangular wave control to control the output torque of the motor to the command torque. The switching unit operates the inverter by overmodulation PWM control, when a first condition is not met. The first condition is defined as a condition that an amplitude parameter increases and reaches a determination value. The amplitude parameter is defined as either of an amplitude of an output voltage vector of the inverter and a modulation factor of the output voltage of the inverter. The switching unit switches operation of the inverter from operation by the overmodulation operating unit to operation by the rectangular wave operating unit, when both the first condition and a second condition are met. The second condition is defined as a condition that a change amount in a negative d-axis direction of a current vector of a current flowing to the motor after the first condition is met reaches a predetermined amount.

Either of the amplitude of the output voltage vector of the inverter and the modulation factor of the output voltage of the inverter is defined as the amplitude parameter. In addition, the condition that the amplitude parameter increases and reaches the determination value is defined as the first condition. In related technology, when the first condition is not met, the inverter is operated by overmodulation PWM control. When the first condition is met, control mode is switched from overmodulation PWM control to rectangular wave control, and the inverter is operated.

When a command current vector is included in a current range that is unattainable when the current vector of the current flowing to the motor is in a steady state, in the related technology, a hunting phenomenon occurs. In the hunting phenomenon, the control mode is frequently switched between overmodulation PWM control and rectangular wave control. Specifically, before the switchover to rectangular wave control, an actual current vector is positioned on the negative d-axis side in relation to the command current vector.

As a result of the switchover from overmodulation PWM control to rectangular wave control, the actual current vector changes so as to be positioned on the positive d-axis side in relation to the command current vector. As a result, the amplitude parameter subsequently decreases. The first condition is no longer met. The control mode is then switched from rectangular wave control to overmodulation PWM control. Subsequently, as a result of the amplitude parameter once again increasing and the first condition being met, the control mode is switched from overmodulation PWM control to rectangular wave control.

In this way, the switchover from overmodulation PWM control to rectangular wave control and the switchover from rectangular wave control to overmodulation PWM control are alternately repeated. That is, the hunting phenomenon occurs. When the hunting phenomenon occurs, a problem arises in that torque fluctuations occur in the motor.

Therefore, in the above-described exemplary embodiment, the second condition is set. The second condition is that the change amount in the negative d-axis direction of the current vector after the amplitude parameter has reached the determination value reaches a predetermined amount. When both the first condition and the second condition are met, operation of the inverter is switched from operation by the overmodulation operating unit to operation by the rectangular wave operating unit. As a result of the second condition being set, even when the control mode is switched from overmodulation PWM control to rectangular wave control, the actual current vector can more easily be positioned on the negative d-axis side in relation to the command current vector. As a result, the occurrence of the hunting phenomenon can be suppressed, while suppressing current fluctuations in the motor.

BRIEF DESCRIPTION OF THE DRAWINGS

In the accompanying drawings:

FIGS. 8A and 8B are time charts of an example of the switchover process;

DETAILED DESCRIPTION OF THE PREFERRED EMBODIMENTS

First Embodiment

A first embodiment in which a control apparatus of the present disclosure is applied to a vehicle (such as an electric car or a hybrid car) will be described with reference to the drawings. The vehicle includes a three-phase motor as an onboard main machine.

Figure 1:
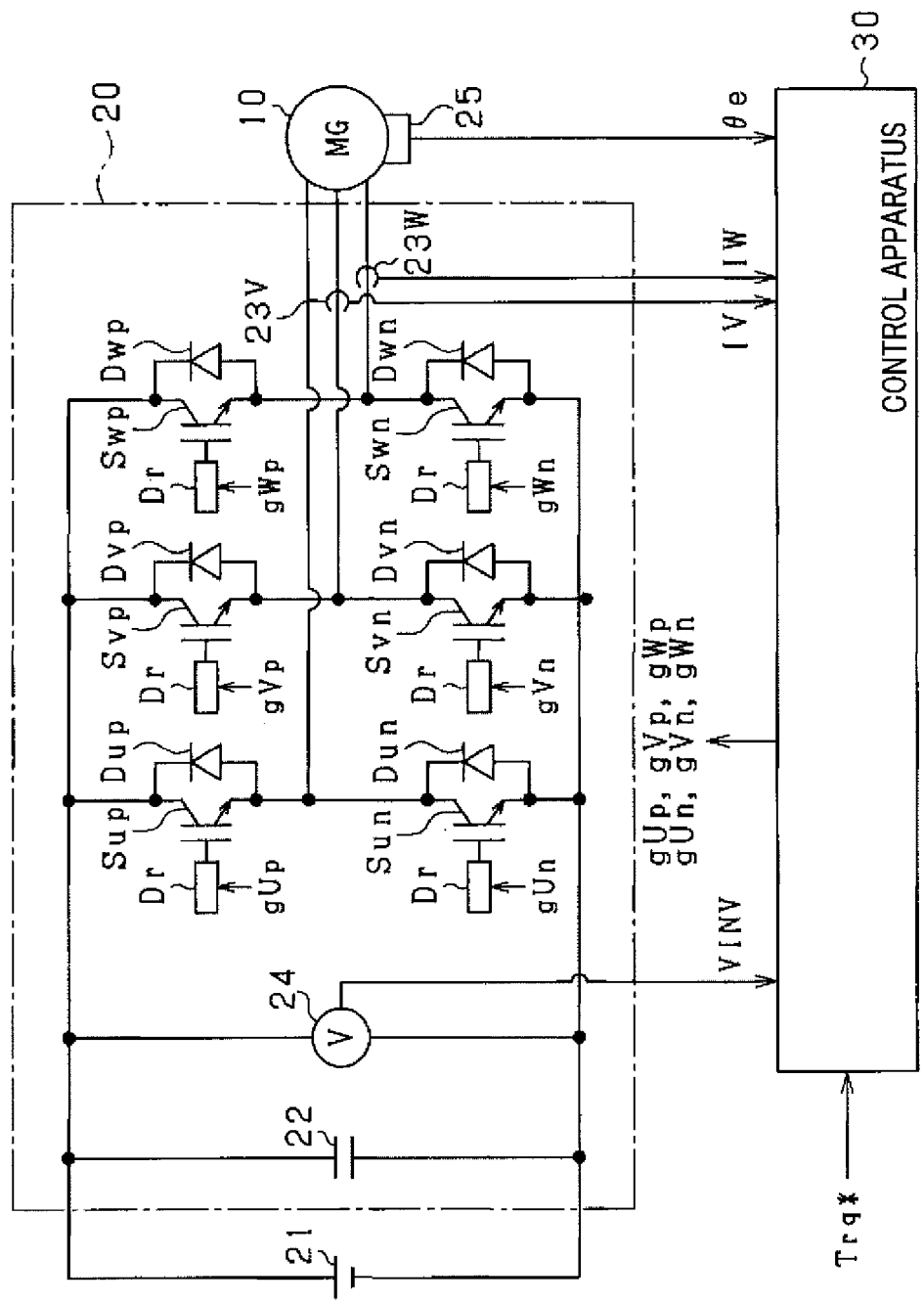
FIG. 1 is a diagram of an overall configuration of a motor control system according to a first embodiment.

As shown in FIG. 1, a motor control system includes a motor generator (MG) 10, a three-phase inverter 20, and a control apparatus 30. The control apparatus 30 controls the motor generator 10. According to the present embodiment, the motor generator 10 is a main on-board engine. A rotor of the motor generator 10 is mechanically connected to a drive wheel not shown in figures. According to the present embodiment, an interior permanent magnet synchronous motor (IPMSM) that is a salient-pole machine is used as the motor generator 10.

The motor generator 10 is connected to a high-voltage battery 21 via the inverter 20. The high-voltage battery 21 serves as a direct-current power supply. An output voltage of the high-voltage battery 21 is, for example, 100 volts or higher. A smoothing capacitor 22 is provided between the high-voltage battery 21 and the inverter 20. The smoothing capacitor 22 smoothes an input voltage of the inverter 20.

Here, when the control system is provided with a boost converter that boosts the output voltage of the high-voltage battery 21 and outputs the boosted voltage to the inverter 20, the boost converter corresponds to the direct-current power supply.

The inverter 20 has three sets of series-connection bodies that are composed of upper arm switches Sup, Svp, and Swp, and lower arm switches Sun, Svn, and Swn. A connection point between U-phase upper and lower arm switches Sup and Sun is connected to a U-phase of the motor generator 10. A connection point between V-phase upper and lower arm switches Svp and Svn is connected to a V-phase of the motor generator 10. A connection point between W-phase upper and lower switches Swp and Swn is connected to a W-phase of the motor generator 10. According to the present embodiment, voltage-control type semiconductor switching elements are used as the switches Sup, Sun, Svp, Svn, Swp, and Swn. More specifically, insulated-gate bipolar transistors (IGBTs) are used. Freewheeling diodes Dup, Dun, Dvp, Dvn, Dwp, and Dwn are respectively connected in inverse parallel to the switches Sup, Sun, Svp, Svn, Swp, and Swn.

The motor control system further includes a phase current detecting unit. The phase current detecting unit detects currents of at least two phases, among phase currents flowing to the motor generator 10. According to the present embodiment, the phase current detecting unit includes a V-phase current detecting unit 23V and a W-phase current detecting unit 23W. The V-phase current detecting unit 23V detects the current flowing to the V phase. The W-phase current detecting unit 23W detects the current flowing to the W phase. In addition, the motor control system includes a voltage detecting unit 24 and an angle detecting unit 25. The voltage detecting unit 24 detects the output voltage of the high-voltage battery 21 as a power supply voltage VINV of the inverter 20. The angle detecting unit 25 detects an electrical angle θe of the motor generator 10. For example, a resolver can be used as the angle detecting unit 25.

The control apparatus 30 is mainly configured by a microcomputer. The control apparatus 30 operates the inverter 20 so as to perform feedback control to control an output torque of the motor generator 10 to a command torque Trq*. Specifically, the control apparatus 30 generates respective operating signals gUp, gUn, gVp, gVn, gWp, and gWn based on detection values from the various detecting units, described above, to turn ON and OFF the switches Sup, Sun, Svp, Svn, Swp, and Swn configuring the inverter 20.

The control apparatus 30 then outputs the generated operating signals gUp, gUn, gVp, gVn, gWp, and gWn to drive circuits Dr that respectively correspond to the switches Sup, Sun, Svp, Svn, Swp, and Swn. Here, the operating signals gUp, gVp, and gWp for the upper arm side and the corresponding operating signals gUn, gVn, and gWn for the lower arm side are mutually complementary signals. That is, an upper arm switch and the corresponding lower arm switch are alternately set to an ON state. The command torque Trq* is outputted from, for example, a control apparatus that is provided outside of the control apparatus 30 and is of a higher order than the control apparatus 30.

Next, torque control of the motor generator 10 performed by the control apparatus 30 will be described with reference to FIG. 2.

A two-phase converting unit 30a (shown as a uvw to dq in FIG. 2) converts a U-phase current IU, a V-phase current IV, and a W-phase current 1W on a three-phase fixed coordinate system of the motor generator 10 to d- and q-axis currents Idr and Iqr on a dq-axis coordinate system. The dq-axis coordinate system is a two-phase rotary coordinate system. The two-phase converting unit 30a performs the conversion based on the V-phase current IV detected by the V-phase current detecting unit 23V, the W-phase current IW detected by the W-phase current detecting unit 23W, and the electrical angle θe detected by the angle detecting unit 25. According to the present embodiment, the two-phase converting unit 30a outputs the converted d- and q-axis currents Idr and Iqr from which high-frequency components are removed by a low-pass filter process performed by the two-phase converting unit 30a.

A torque estimating unit 30b calculates an estimated torque Te of the motor generator 10, based on the d- and q-axis currents Idr and Iqr outputted from the two-phase converting unit 30a. Here, the estimated torque Te may be calculated using a map that associates the d- and q-axis currents Idr and Iqr with the estimated torque Te. Alternatively, the estimated torque Te may be calculated using a model formula.

A torque deviation calculating unit 30c calculates a torque deviation ΔT by subtracting the estimated torque Te from the command torque Trq*.

A phase calculating unit 30d (shown as a PI in FIG. 2) calculates a command voltage phase φ* based on the torque deviation ΔT calculated by the torque deviation calculating unit 30c. The command voltage phase φ* serves a manipulated variable that is used for feedback control to control the estimated torque Te to the command torque Trq*. The command voltage phase φ* is a command value of a voltage phase φ of the output voltage vector of the inverter 20. According to the present embodiment, the command voltage phase φ* is calculated by proportional-integral control in which the torque deviation ΔT is the input.

According to the present embodiment, with a positive direction of the d axis as reference, a counter-clockwise direction from the reference is defined as a positive direction of the voltage phase φ. Therefore, when the estimated torque Te is insufficient in relation to the command torque Trq*, the voltage phase φ is increased. When the estimated torque Te is excessive in relation to the command torque Trq*, the voltage phase φ is decreased.

A command current calculating unit 30e (shown as a MTPA in FIG. 2) calculates d- and q-axis command currents Id* and Iq* based on the command torque Trq*. The d- and q-axis command currents Id* and Iq* are used to obtain the command torque Trq*. According to the present embodiment, currents for actualizing minimum current maximum torque control (maximum torque per ampere (MTPA) control) are calculated as the d- and q-axis command currents Id* and Iq*.

A d-axis deviation calculating unit 30f calculates a d-axis current deviation ΔId by subtracting the d-axis current Idr from the d-axis command current Id*. A q-axis deviation calculating unit 30g calculates a q-axis current deviation ΔIq by subtracting the q-axis current Iqr from the q-axis command current Iq*.

A modulation factor calculating unit 30h (shown as a PI in FIG. 2) calculates a preliminary modulation factor Mnf based on the d-axis current deviation ΔId and the q-axis current deviation ΔIq. According to the present embodiment, the modulation factor calculating unit 30h corresponds to a parameter calculating unit. Here, a modulation factor M is a value obtained by a voltage amplitude Vn of the output voltage vector being normalized by the power supply voltage VINV detected by the voltage detecting unit 24. According to the present embodiment, the modulation factor M is calculated by an expression (eq1) below.

[Formula 1]

$$M = \frac{1}{\sqrt{1.5}} \frac{Vn}{\frac{VINV}{2}} \times 100 \tag{eq1}$$

Here, the voltage amplitude Vn refers to an amplitude command value of the output voltage vector of the inverter 20 on the two-phase rotary coordinate system. Specifically, the voltage amplitude Vn is defined as a square root of a sum of a square of a d-axis voltage Vd, which is the d-axis component of the output voltage vector, and a square of a q-axis voltage Vq. The d-axis voltage Vd is a d-axis component of the output voltage vector. The q-axis voltage Vq is a q-axis component of the output voltage vector.

The modulation factor calculating unit 30h first calculates a d-axis command voltage Vd* based on the d-axis current deviation ΔId. The d-axis command voltage Vd* is a manipulated variable for performing feedback control to control the d-axis current Idr to the d-axis command current Id*. The modulation factor calculating unit 30h then calculates a q-axis command voltage Vq* based on the q-axis current deviation ΔIq. The q-axis command voltage Vq* is a manipulated variable for performing feedback control to control the q-axis current Iqr to the q-axis command current Iq*.

According to the present embodiment, proportional-integral control is used as the feedback control. The modulation factor calculating unit 30h calculates a preliminary voltage amplitude Vnf based on the calculated d- and q-axis command voltages Vd* and Vq*. Specifically, the modulation factor calculating unit 30h calculates the preliminary voltage amplitude Vnf as a square root of a sum of a square of the d-axis command voltage Vd* and a square of the q-axis command voltage Vq*. The modulation factor calculating unit 30h calculates the preliminary modulation factor Mnf by normalizing the preliminary voltage amplitude Vnf by the power supply voltage VINV, based on the expression (eq1) above.

A limiter 30i calculates a command modulation factor M* by performing a limiter process on the preliminary modulation factor Mnf outputted from the modulation factor calculating unit 30h. The process performed by the limiter 30i will be described in detail hereafter.

A modulator 30j calculates three phase command voltages VU, VV, and VW, based on the command modulation factor M* outputted from the limiter 30i and the command voltage phase φ* outputted from the phase calculating unit 30d. The phases of the three phase command voltages VU, VV, and VW are shifted from each other by an electrical angle of 120 degrees.

The modulator 30j selects a single control mode among a plurality of control modes, based on a switchover command outputted from a switchover determining unit 30k, and then calculates the three phase command voltages W, VV, and VW. The plurality of control modes includes sine wave PWM control, overmodulation PWM control, and rectangular wave control. Sine wave PWM control is control performed to operate the inverter 20 such that the output voltage of the inverter 20 is a sine wave with an electrical angle velocity ω of the motor generator 10, when the preliminary modulation factor Mnf is less than a predetermined modulation factor Ma. Sine wave PWM control is performed when peak values of the command voltages VU, VV, and VW are ½ of the power supply voltage VINV or lower. For example, the predetermined modulation factor Ma is set to 100%.

Figure 3A:
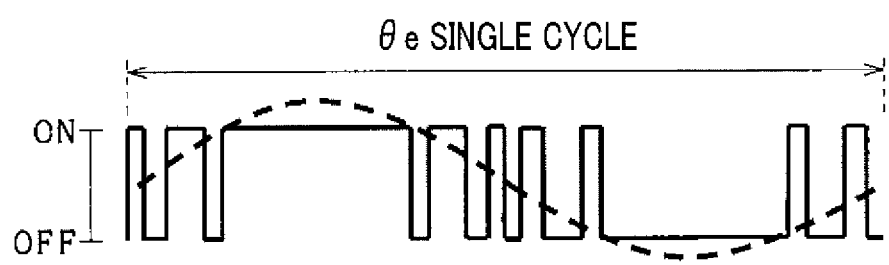
FIGS. 3A and 3B are diagrams of operating signals during overmodulation PWM control and rectangular wave control.

As shown in FIG. 3A, overmodulation PWM control is control performed to operate the inverter 20, while compensating for insufficiency in the voltage actually applied to the motor generator 10 in relation to the command voltages VU, VV, and VW, when the peak values of the command voltages VU, VV, and VW exceed ½ of the power supply voltage VINV. In overmodulation PWM control, both voltage amplitude Vn and voltage phase φ can be operated. Overmodulation PWM control is performed when the preliminary modulation factor Mnf is the predetermined modulation factor Ma or greater.

Figure 3B:
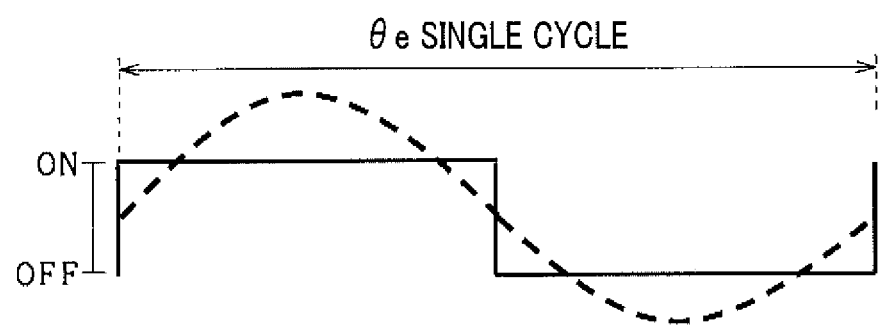

Meanwhile, as shown in FIG. 3B, rectangular wave control is control in which, during a single electrical angle cycle of the motor generator 10, a period over which the upper arm switches are turned ON and a period over which the lower arm switches are turned ON each occur once. In rectangular wave control, the modulation factor is fixed at a maximum modulation factor Mmax. Therefore, only the voltage phase φ is a manipulated variable.

According to the present embodiment, the modulator 30j includes an overmodulation operating unit and a rectangular wave operating unit. The switchover determining unit 30k will be described in detail hereafter.

An operating signal generating unit 30m generates the operating signals gUp, gUp, gVp, gVn, gWp, and gWn based on the three phase control voltages Vu, VV, and VW outputted from the modulator 30j. The operating signal generating unit 30m then outputs the operating signals gUp, gUp, gVp, gVn, gWp, and gWn to the drive circuits Dr. The operating signal generating unit 30m may generate the operating signals gUp, gUp, gVp, gVn, gWp, and gWn by, for example, triangular wave comparison PWM control that is based on a comparison of magnitude between the three phase control voltages Vu, VV, and VW a carrier signal of a triangular wave signal or the like. Instead of the operating signals being generated based on the carrier signal, the operating signal may be generated based on a pulse pattern.

Next, a switchover process for switching the control mode from overmodulation PWM control to rectangular wave control will be described. This switchover process is a characteristic feature of the present embodiment. The switchover process is provided to prevent the occurrence of a hunting phenomenon. In the hunting phenomenon, the control mode is frequently switched between overmodulation PWM control and rectangular wave control. The hunting phenomenon will be described with reference to FIG. 4 and FIG. 5, before the description of the switchover process.

Figure 4:
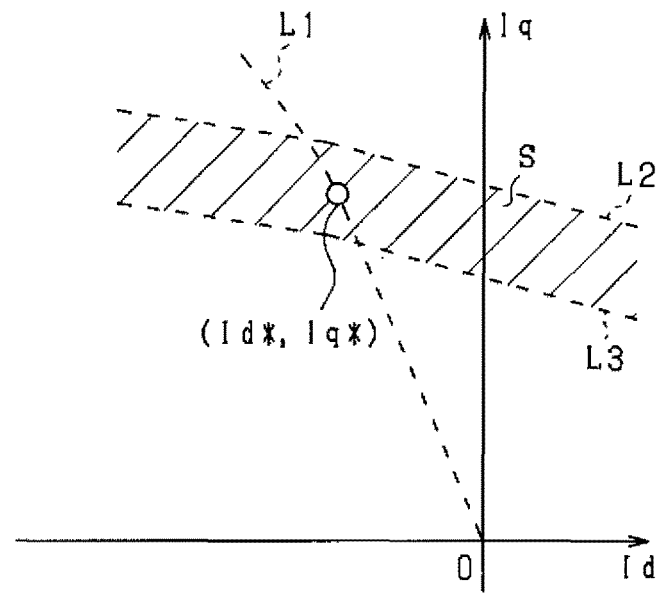
FIG. 4 is a diagram of a current range S on a dq-axis coordinate system in which a hunting phenomenon occurs.

FIG. 4 shows a first line L1, a second line L2, and a third line L3. The first line L1 is a trajectory of the d- and q-axis currents Id and Iq that is determined by maximum torque per ampere control. The second line L2 is a trajectory of the d- and q-axis currents Id and Iq when rectangular wave control is performed. The second line L2 is the trajectory of when only the voltage phase φ is operated, while the modulation factor M is fixed at the maximum modulation factor Mmax. According to the present embodiment in particular, the maximum modulation factor Mmax is set to 127%. The third line L3 is a trajectory of the d- and q-axis currents Id and Iq when only the voltage phase φ is operated, while the modulation factor M is fixed at a determination modulation factor Mth.

According to the present embodiment, the determination modulation factor Mth is set to the maximum value of the modulation factor that is possible in overmodulation PWM control. According to the present embodiment in particular, the determination modulation factor Mth is set to 125%. The determination modulation factor Mth is set to a value that is greater than the predetermined modulation factor Ma that is a switchover threshold for switching the control mode between sine wave PWM control and overmodulation PWM control.

Here, as a configuration for comparison with the present embodiment, a related technology is defined. The related technology is a configuration in which the switchover determining unit 30k is eliminated from the above-described configuration in FIG. 2, and the processes performed by the limiter 30i and the modulator 30j are performed as described below.

Specifically, when the preliminary modulation factor Mnf is less than the determination modulation factor Mth, the limiter 30i outputs the preliminary modulation Mnf as is, as the command modulation factor M*. When the preliminary modulation factor Mnf is the determination modulation factor Mth or greater and less than the maximum modulation factor Mmax, the limiter 30i outputs the determination modulation factor Mth as the command modulation factor M*. When the preliminary modulation factor Mnf is the maximum modulation factor Max or greater, the limiter 30i outputs the maximum modulation factor Mmax as the command modulation factor M*.

When the inputted command modulation factor M* is less than the predetermined modulation factor Ma, the modulator 30j selects sine wave PWM control. When the command modulation factor M* is the predetermined modulation factor Ma or greater and less than the maximum modulation factor Mmax, the modulator 30j selects overmodulation PWM control. When the command modulation factor M* is the maximum modulation factor Mmax or greater, the modulator 30j selects rectangular wave control.

As shown in FIG. 4, as a result of the command torque Trq* being set, a command current vector corresponding to the command torque Trq* is designated on the first line L1. The command current vector is defined as a square root of a sum of a square of the d-axis command current Id* and a square of the q-axis command current Iq*.

Here, a significant difference is present between the maximum voltage that can be outputted from the inverter 20 in overmodulation PWM control and the voltage outputted from the inverter 20 in rectangular wave control. As a result of this difference, a voltage range that cannot be outputted from the inverter 20 is present. As shown in FIG. 4, a current range S that is unattainable when the current vector of the motor generator 10 is in a steady state is present. The current range S refers to an area sandwiched between the second line L2 and the third line L3 on the dq-axis coordinate system.

When the command current vector is designated on a portion of the first line L1 included in the current range S, the actual current vector cannot be set to the command current vector by overmodulation PWM control or rectangular wave control. As a result, in the above-described related technology, the current significantly fluctuates mainly around the command current vector. The hunting phenomenon occurs. In the hunting phenomenon, the control mode is frequently switched between overmodulation PWM control and rectangular wave control. That is, in overmodulation PWM control before switchover to rectangular wave control, the actual current vector of the motor generator 10 is positioned towards the negative side of the d axis in relation to the first line L1, as indicated by point A in FIG. 5.

As a result of the preliminary modulation factor Mnf increasing and reaching the maximum modulation factor Mmax or greater, the modulator 30j switches the control mode from overmodulation PWM control to rectangular wave control. Consequently, the actual current vector can be changed so as to be positioned towards the positive side of the d axis in relation to the first line L1, as indicated by point B in FIG. 5. In this case, the d-axis current deviation ΔId changes from a positive value to a negative value. The preliminary modulation factor Mnf calculated by the modulation factor calculating unit 30b starts to decrease. As a result, the preliminary modulation factor Mnf decreases and becomes less than the maximum modulation factor Mmax. The modulator 30j switches the control mode from rectangular wave control to overmodulation PWM control.

Figure 5:
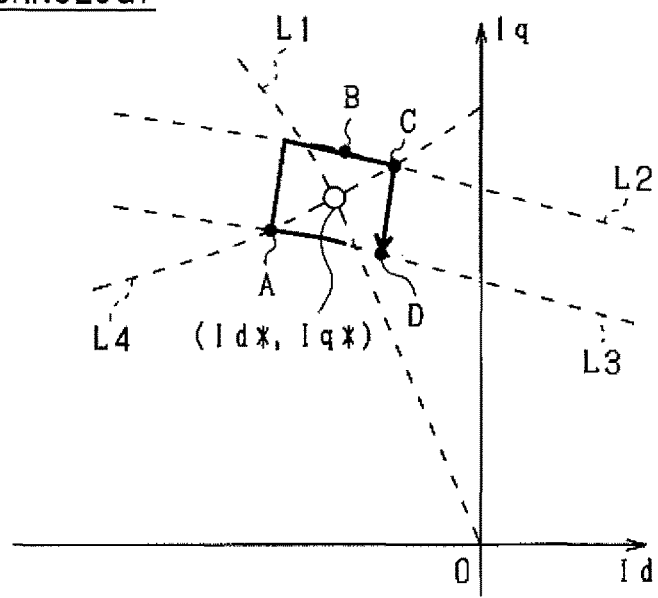
FIG. 5 is a diagram of a transition of an operation point on the dq-axis coordinate system when the hunting phenomenon occurs.

In FIG. 5, the switchover from rectangular wave control to overmodulation PWM control is indicated by the operation point transitioning from point C to point D. Subsequently, the control mode is once again switched from overmodulation PWM control to rectangular wave control. In this way, the switchover from overmodulation PWM control to rectangular wave control and the switchover from rectangular wave control to overmodulation PWM control are alternately repeated. That is, the hunting phenomenon occurs. When the hunting phenomenon occurs, a problem arises in that torque fluctuation occurs in the motor generator 10.

According to the present embodiment, a switchover process, described below, is performed to solve the foregoing problem.

Figure 6:
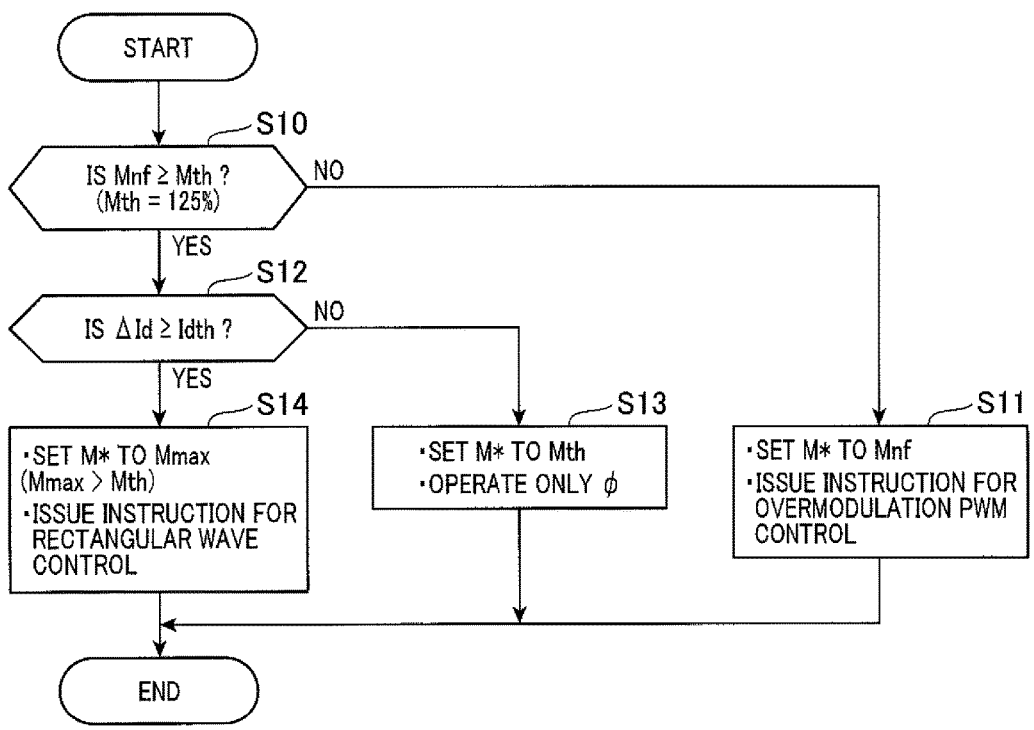
FIG. 6 is a flowchart of the steps in a switchover process.

FIG. 6 shows the steps in the switchover process. The switchover determining unit 30k of the control apparatus 30 repeatedly performs the switchover process at, for example, a predetermined interval. According to the present embodiment, the control apparatus 30 includes a switching unit and a current change amount calculating unit.

In this series of processes, first, at step S10, the switchover determining unit 30k determines whether or not the preliminary modulation factor Mnf calculated by the modulation factor calculating unit 30h is the determination modulation factor Mth or greater. According to the present embodiment, this determination condition corresponds to a first condition.

When determined that the first condition is not met at step S10, the switchover determining unit 30k proceeds to step S11. At step S11, the switchover determining unit 30k instructs the limiter 30i to not restrict the preliminary modulation factor Mnf. As a result, the limiter 30i outputs the inputted preliminary modulation factor Mnf as is, as the command modulation factor M*.

Figure 7A:
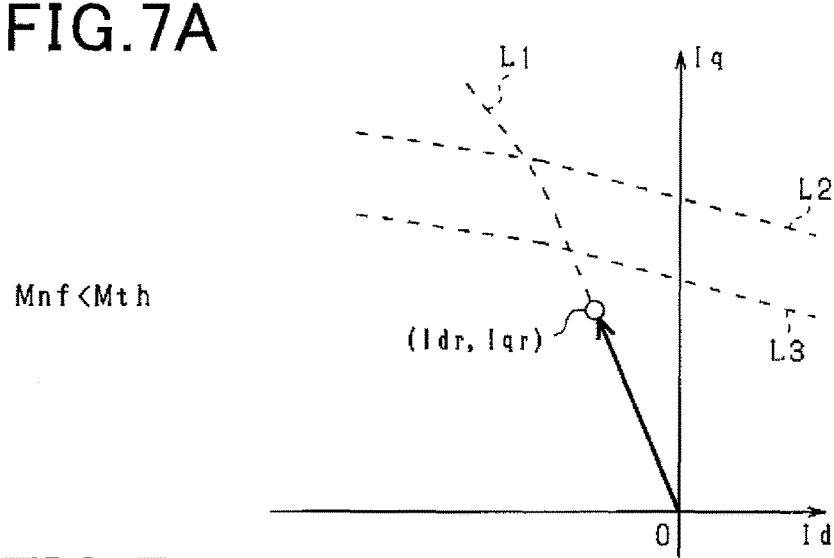
FIGS. 7A to 7C are diagrams of an overview of the switchover process.

In addition, at step S11, the switchover determining unit 30k instructs the modulator 30j to operate the switches of the inverter 20 based on overmodulation PWM control. As a result, both voltage phase φ and voltage amplitude Vn are operated. As shown in FIG. 7A, the actual current vector moves on the first line L1 until the preliminary modulation factor Mnf reaches the determination modulation factor Mth.

Returning to the description of FIG. 6 given above, when determined that the first condition is met at step S10, the switchover determining unit 30k proceeds to step S12. The switchover determining unit 30k determines whether or not the d-axis current deviation ΔId calculated by the d-axis deviation calculating unit 30f is a d-axis specified amount Idth or greater. According to the present embodiment, this determination condition corresponds to a second condition. The d-axis current deviation ΔId at this step corresponds to a current change amount that is the amount of change in the negative d-axis direction of the current vector after the first condition is determined to be met.

When determined that the second condition is not met at step S12, the switchover determining unit 30k proceeds to step S13. At step S13, the switchover determining unit 30k instructs the limiter 30i to fix the preliminary modulation factor Mnf at the determination modulation factor Mth. As a result, the limiter 30i outputs the determination modulation factor Mth as the command modulation factor M*, regardless of the value of the inputted preliminary modulation factor Mnf.

Figure 7B:
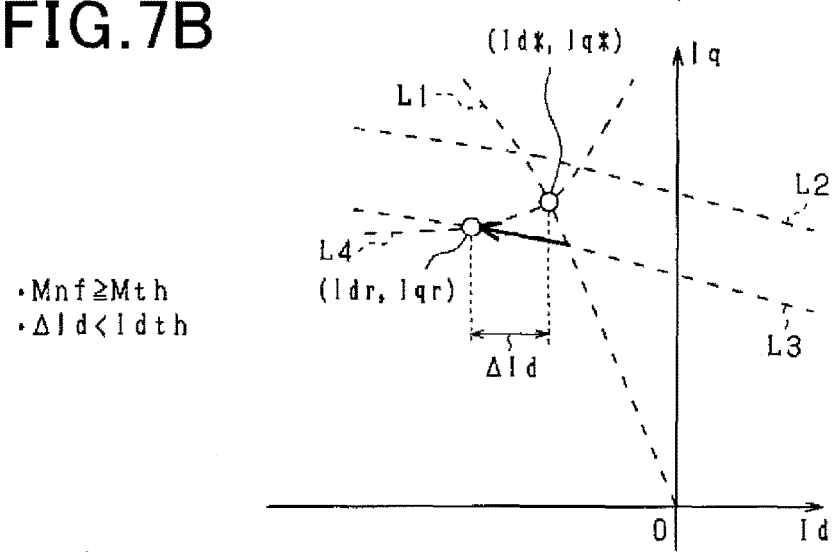

In addition, at step S13, the switchover determining unit 30k instructs the modulator 30j to control the estimated torque Te to the command torque Trq* by operating only the voltage phase φ. Consequently, only the voltage phase φ is operated in the state in which the actual voltage amplitude Vn is fixed at a voltage amplitude corresponding to the determination modulation factor Mth. As a result, as shown in FIG. 7B, the actual current vector moves on the third line L3 until the second condition is subsequently met. In FIG. 7B, a fourth line L4 indicates an equitorque line corresponding to the command torque Trq*.

According to the present embodiment, the d-axis specified amount Idth is set in a following manner. Specifically, with reference to FIG. 7C, an intersection between the first line L1 and the second line L2 is a first intersection. The d-axis current Id corresponding to the first intersection is a first d-axis current Id1. In addition, an intersection between the fourth line L4 that passes through the first intersection and the third line L3 is a second intersection. The d-axis current Id corresponding to the second intersection is a second d-axis current Id2.

Here, as expressed by an expression (eq2) below, the second line L2 and the third line L3 change depending on the electrical angle velocity ω and the voltage amplitude Vn of the motor generator 10. In the expression (eq2) below, Ld and Lq denote d- and q-axis inductances, and ψ denotes a root-mean-square of an armature interlinkage flux of the permanent magnet configuring the rotor.

[Formula 2]

$$Vn^2 = (\omega \cdot Lq \cdot Iq)^2 + \omega^2 (Ld \cdot Id + \Psi)^2 \qquad (eq2)$$

Therefore, the first d-axis current Id1 and the second d-axis current Id2 also change depending on the electrical angle velocity ω and the voltage amplitude Vn. Here, according to the present embodiment, the d-axis specified amount Idth is set based on a maximum value of an absolute value of the difference between the first d-axis current Id1 and the second d-axis current Id2, within the ranges of the electrical angle velocity ω and the voltage amplitude Vn assumed possible when the motor generator 10 is driven. Specifically, for example, the above-described maximum value is set as the d-axis specified amount Idth. Alternatively, a value that is obtained by a margin greater than zero being added to the maximum value may be set as the d-axis specified amount Idth.

Returning to the description of FIG. 6 given above, when determined that the second condition is met at step S12, the switchover determining unit 30k proceeds to step S14. At step S14, the switchover determining unit 30k instructs the limiter 30i to fix the preliminary modulation factor Mnf at the maximum modulation factor Mmax. As a result, the limiter 30i outputs the maximum modulation factor Mmax as the command modulation factor M*, regardless of the value of the inputted preliminary modulation factor Mnf.

Figure 7C:
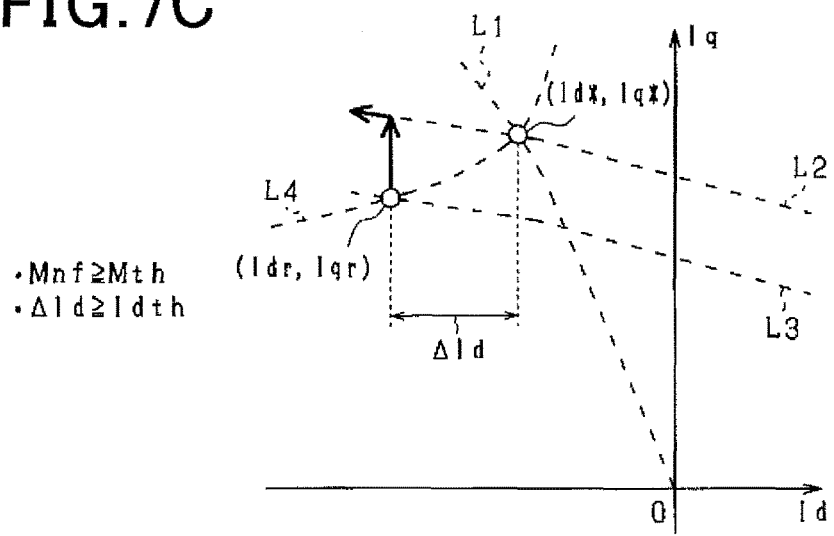

In addition, at step S14, the switchover determining unit 30k instructs the modulator 30j to operate the switches of the inverter 20 based on rectangular wave control. Consequently, only the voltage phase φ is operated, while the actual amplitude Vn is fixed at the voltage amplitude corresponding to the maximum modulation factor Mmax. As a result, as shown in FIG. 7C, the actual current vector moves on the second line L2 until the first condition is no longer met.

FIGS. 8A and 8B show an example of the process for switching the control mode from overmodulation PWM control to rectangular wave control. Here, in FIG. 8A, a solid line indicates the transition of the command modulation factor M*. A broken line indicates the transition of the preliminary modulation factor Mnf. In addition, FIG. 8B shows the transition of the d-axis current deviation ΔId. FIGS. 8A and 8B show the respective transitions in a state in which the command torque Trq* gradually increases. In addition, in FIG. 8A, Mlim indicates an upper limit value of the preliminary modulation factor Mnf calculated by the modulation factor calculating unit 30h.

In the example shown in FIG. 8A and FIG. 8B, until time t1 when the preliminary modulation factor Mnf reaches the determination modulation factor Mth, the command modulation factor M* gradually increases in accompaniment with the gradual increase in the command torque Trq*. According to the present embodiment, the d-axis current deviation ΔId is held at a positive value near zero until time t1.

Subsequently, at time t1, the preliminary modulation factor Mnf reaches the determination modulation factor Mth. Therefore, command modulation factor M* outputted from the limiter 30i is fixed at the determination modulation factor Mth. As a result, the d-axis current deviation ΔId starts to increase. Here, during the period from time t1 to time t2 at which the d-axis current deviation ΔId reaches the d-axis specified amount Idth, the voltage phase φ is operated to compensate for the insufficiency in the estimated torque Te in relation to the command torque Trq*.

Subsequently, at time t2, the d-axis current deviation ΔId reaches the d-axis specified amount Idth. Therefore, the modulator 30j switches the control mode from overmodulation PWM control to rectangular wave control. The command modulation factor M* is fixed at the maximum modulation factor Mmax.

Here, according to the present embodiment, the d-axis current deviation ΔId is a positive value, even when the control mode is switched to rectangular wave control at time t2. This contributes to preventing the occurrence of the hunting phenomenon. The state in which the d-axis current deviation ΔId is a positive value is a state in which the actual current vector after the switchover to rectangular wave control is positioned on the second line L2, towards the negative d-axis side in relation to the first line L1.

Figure 9A:
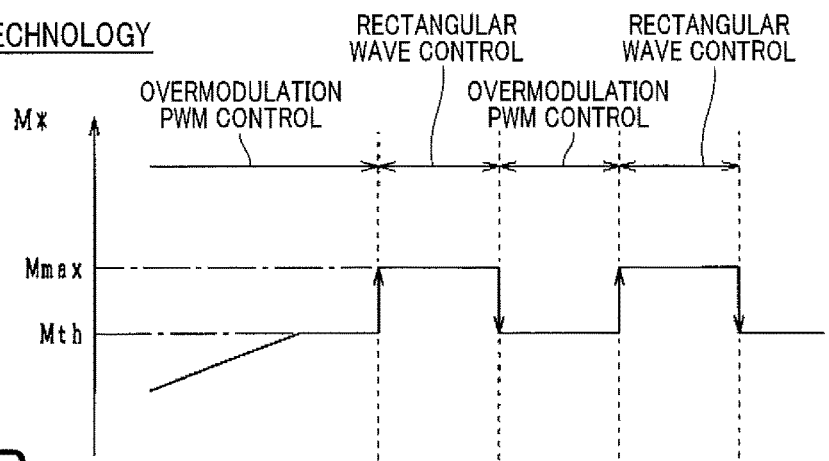
FIGS. 9A to 9C are time charts of a switchover process in a related technology.
Figure 9B:
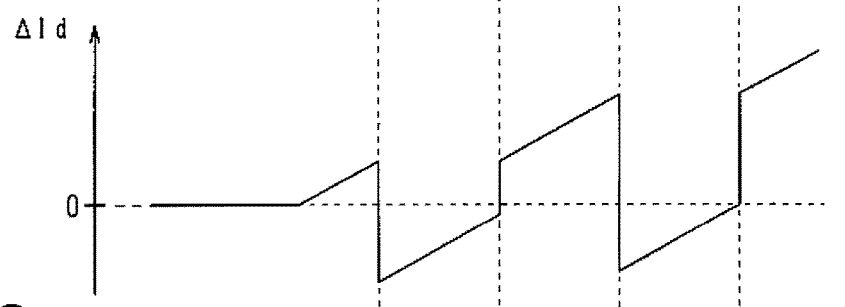
Figure 9C:
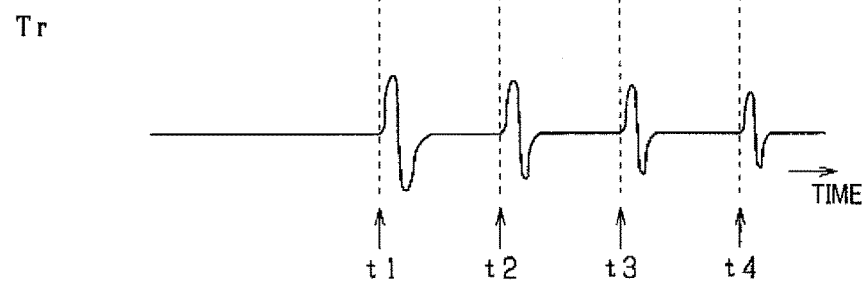

Meanwhile, in the related technology, the d-axis current deviation ΔId may become a negative value as a result of the switchover to rectangular wave control. Hereafter, the related technology will be described with reference to FIGS. 9A to 9C. FIG. 9A shows the transition of the command modulation factor M*. FIG. 9B shows the transition of the d-axis current deviation ΔId. FIG. 9C shows the transition of an output torque Tr of the motor generator 10.

In the example shown in FIG. 9A and FIG. 9B, the preliminary modulation factor Mnf reaches the maximum modulation factor Mmax at time t1. As a result, the control mode is switched from overmodulation PWM control to rectangular wave control. However, as a result of this switchover, the actual current vector changes so as to be positioned on the second line L2 towards the positive d-axis side in relation to the first line L1.

Therefore, the d-axis current deviation ΔId becomes a negative value. The d-axis current deviation ΔId becoming a negative value indicates that the estimated torque Te is excessive in relation to the command torque Trq*. Therefore, subsequently, the preliminary modulation factor Mnf decreases and becomes less than the maximum modulation factor Mmax. At time t2, the control mode is switched from rectangular wave control to overmodulation PWM control. Switchovers such as this continuously occur at times t1, t2, t3, and t4. Consequently, significant torque fluctuations continuously occur. As a result, drivability may deteriorate.

According to the present embodiment described in detail above, the following effects can be achieved.

When the d-axis current deviation ΔId is determined to have reached the d-axis specified amount Idth after the preliminary modulation factor Mnf reaches the determination modulation factor Mth, the control mode is switched from overmodulation PWM control to rectangular wave control. As a result, the occurrence of the hunting phenomenon can be prevented during the switchover from overmodulation PWM control to rectangular wave control.

According to the present embodiment in particular, when the first condition is met and the second condition is not met, only the voltage phase φ is operated, while the command modulation factor M* is fixed at the determination modulation factor Mth. The estimated torque Te is thereby controlled to the command torque Trq*. As a result, the difference between modulation factors before and after the switchover from overmodulation PWM control to rectangular wave control can be reduced. Torque fluctuations occurring during the switchover can be reduced.

Second Embodiment

A second embodiment will be described below with reference to the drawings. The description mainly focuses on the differences between the present embodiment and the above-described first embodiment. According to the present embodiment, the second condition in the switchover process for switching the control mode from overmodulation PWM control to rectangular wave control is changed.

Figure 10:
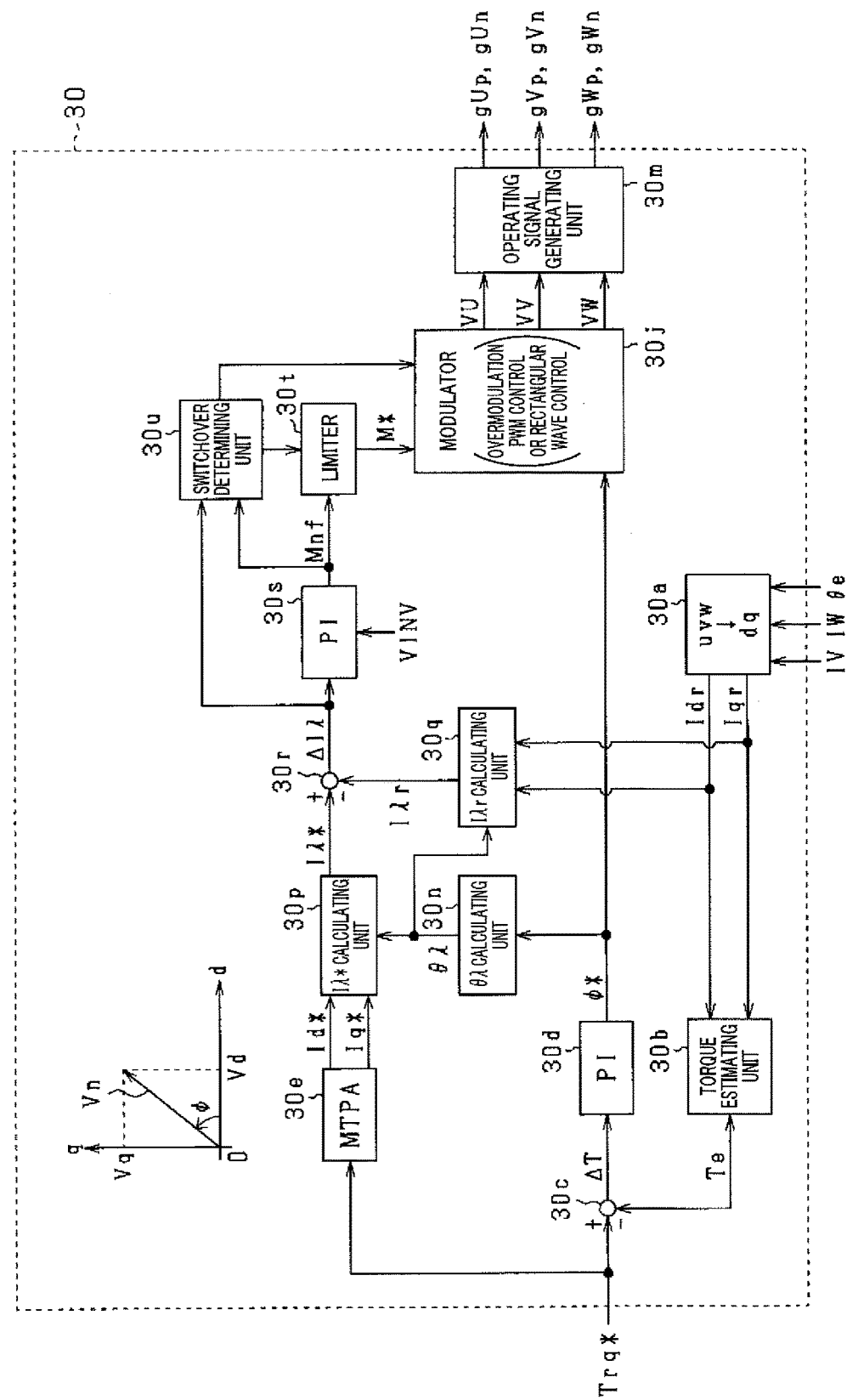
FIG. 10 is a block diagram of motor control according to a second embodiment.

FIG. 10 shows a block diagram of torque control according to the present embodiment. In FIG. 10, processes that are the same as those shown in FIG. 2, described above, are given the same reference numbers for convenience.

A λ-axis setting unit 30n (shown as a θX calculating unit in FIG. 10) calculates an angle θλ based on the d- and q-axis inductances Ld and Lq, and the command voltage phase φ* outputted by the phase calculating unit 30d. The angle θλ is an angle formed by the d axis and a X axis on the dq-axis coordinate system. The λ axis will be described below.

A voltage equation of the permanent magnet synchronous machine is expressed by an expression (eq3) below.

[Formula 3]

$$\begin{bmatrix} Vd \\ Vq \end{bmatrix} = \begin{bmatrix} p \cdot Ld + R & -\omega \cdot Lq \\ \omega \cdot Ld & p \cdot Lq + R \end{bmatrix} \begin{bmatrix} Id \\ Iq \end{bmatrix} + \begin{bmatrix} 0 \\ \omega \cdot \Psi \end{bmatrix} \quad (eq3)$$

In the expression (eq3) above, p denotes a differential operator, and R denotes armature winding resistance. In the expression (eq3) above, when a steady state in which a rotation frequency of the motor generator 10 is fixed is assumed and a condition that a transient phenomenon is ignored is applied, p=0. In addition, a condition that the rotation frequency of the motor generator 10 is sufficiently high and relationships R<<ω×Ld and R<<ω×Lq are established is applied to the expression (eq3) above. From this, the expression (eq3) above is expressed by an expression (eq4) below.

[Formula 4]

$$\begin{bmatrix} Vd \\ Vq \end{bmatrix} = \begin{bmatrix} 0 & -\omega \cdot Lq \\ \omega \cdot Ld & 0 \end{bmatrix} \begin{bmatrix} Id \\ Iq \end{bmatrix} + \begin{bmatrix} 0 \\ \omega \cdot \Psi \end{bmatrix} \quad (eq4)$$

The relationship between the d- and q-axis voltages Vd and Vq, and the voltage phase φ and the voltage amplitude Vn is expressed by an expression (eq5) below.

[Formula 5]

$$\begin{bmatrix} Vd \\ Vq \end{bmatrix} = \begin{bmatrix} Vn \cdot \cos\phi \\ Vn \cdot \sin\phi \end{bmatrix} \quad (eq5)$$

Here, a voltage equation when the voltage phase φ changes by only a minute amount Δφ is expressed by an expression (eq6) below, using the expressions (eq4) and (eq5) above.

[Formula 6]

$$\begin{bmatrix} Vd\phi \\ Vq\phi \end{bmatrix} = \begin{bmatrix} 0 & -\varpi \cdot Lq \\ \varpi \cdot Ld & 0 \end{bmatrix} \begin{bmatrix} Id\phi \\ Iq\phi \end{bmatrix} + \begin{bmatrix} 0 \\ \varpi \cdot \Psi \end{bmatrix} \quad (eq6)$$

where, $Vd\phi = Vn \cos(\phi+\Delta\phi) = Vn(\cos\phi \cos\Delta\phi - \sin\phi \sin\Delta\phi) \approx Vd - \Delta\phi \cdot Vn \sin\phi$ $Vq\phi = Vq \sin(\phi+\Delta\phi) = Vn(\sin\phi \cos\Delta\phi + \cos\phi \sin\Delta\phi) \approx Vq + \Delta\phi \cdot Vn \cos\phi$ When the expression (eq4) above is subtracted from the expression (eq6) above, an expression (eq7) below is derived.

[Formula 7]

$$\begin{bmatrix} Vd\phi - Vd \\ Vq\phi - Vq \end{bmatrix} = \begin{bmatrix} 0 & -\omega \cdot Lq \\ \omega \cdot Ld & 0 \end{bmatrix} \begin{bmatrix} Id\phi - Id \\ Iq\phi - Iq \end{bmatrix} \quad (eq7)$$

In the expression (eq7) above, Idφ−Id on the right side indicates a d-axis current change amount ΔIdφ, and Iqφ−Iq on the right side indicates a q-axis current change amount ΔIqφ. When the expression (eq7) above is solved for the current change amounts ΔIdφ and ΔIqφ, an expression (eq8) below is derived.

[Formula 8]

$$\begin{bmatrix} \Delta Id\phi \\ \Delta Iq\phi \end{bmatrix} = \begin{bmatrix} 0 & -\omega \cdot Lq \\ \omega \cdot Ld & 0 \end{bmatrix}^{-1} \begin{bmatrix} Vd\phi - Vd \\ Vq\phi - Vq \end{bmatrix} = \frac{Vn}{\omega} \begin{bmatrix} \dfrac{\cos\phi}{Ld} \\ \dfrac{\sin\phi}{Lq} \end{bmatrix} \Delta\phi \quad (eq8)$$

Figure 11:
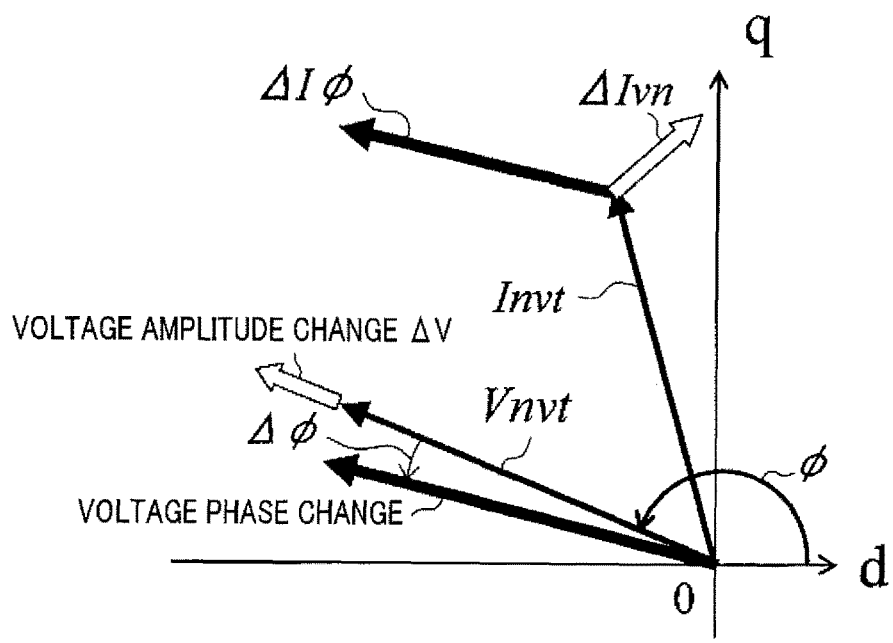
FIG. 11 is a diagram for explaining changes in a current vector accompanying changes in an output voltage vector.
Figure 12:
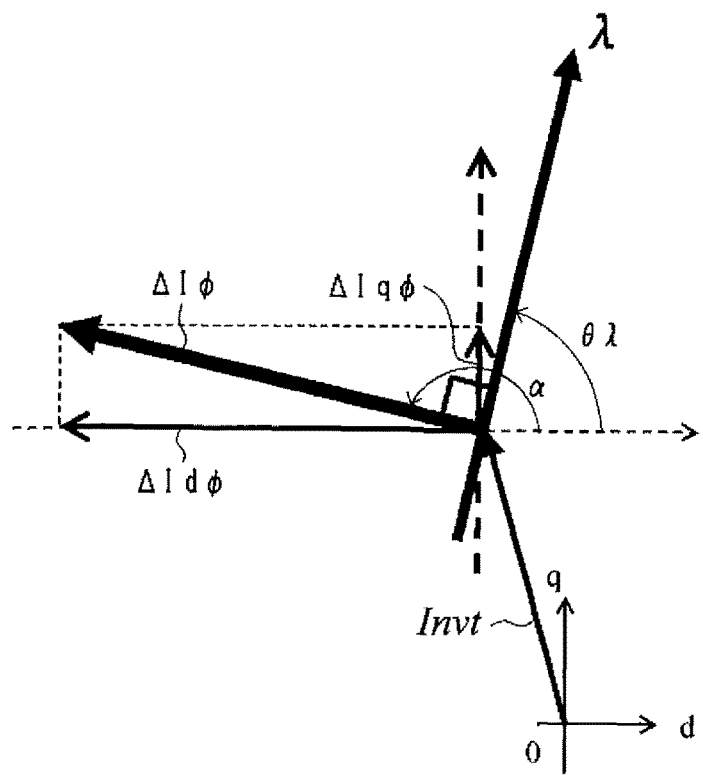
FIG. 12 is a diagram of a method for calculating an angle formed by a d axis and a λ axis.

FIG. 11 shows a voltage vector Vnvt and a current vector Invt on the dq-axis coordinate system. In FIG. 11, a change in the current vector Invt when the voltage phase φ changes by the minute amount Δφ is indicated by ΔIφ. In addition, a change in the current vector Invt when the voltage amplitude changes by a minute amount ΔVn is indicated by ΔIvn. FIG. 12 is an enlarged view of the changes in the current vector Invt. A change direction α of the current vector Invt in relation to the d axis when the voltage phase φ is minutely changed by the expression (eq8) above is expressed by an expression (eq9) below.

[Formula 9]

$$\alpha = \operatorname{Tan}^{-1}\left(\frac{\Delta Iq\phi}{\Delta Id\phi}\right) = \operatorname{Tan}^{-1}\left(\frac{Ld}{Lq}\tan\phi\right) \quad (eq9)$$

Figure 13:
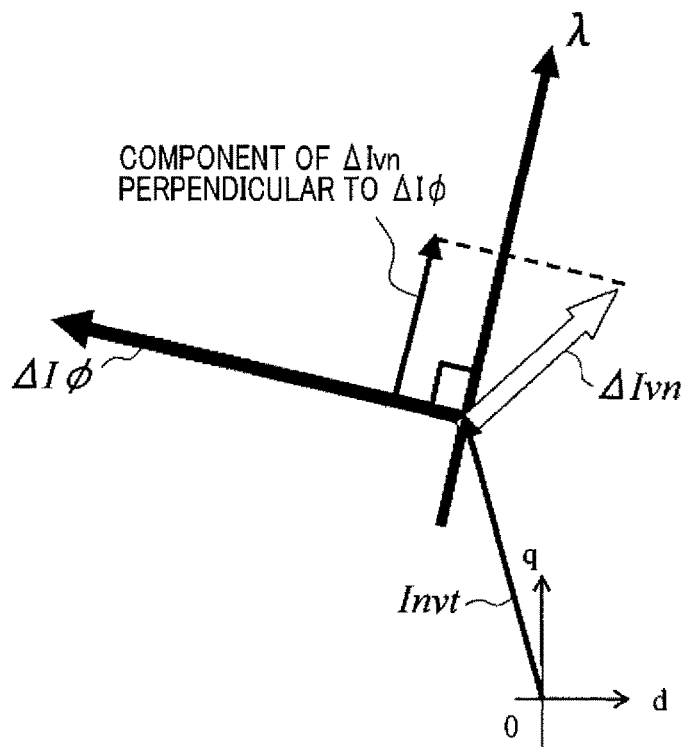
FIG. 13 is a diagram for explaining the λ axis.

For example, the change direction α can be calculated between −π and +π by an arctangent operation of the expression (eq9) above. Here, in FIG. 13, a coordinate axis that extends in a direction perpendicular to the change direction α of the current vector Invt is indicated as being the λ axis that is a non-interfering axis. That is, the λ axis is a coordinate axis in a direction in which the change in the current vector Invt when the voltage phase φ minutely changes is zero. Of the change ΔIvn in the current vector Invt when the voltage amplitude Vn changes by only the minute amount ΔVn, the λ-axis component in which the change ΔIvn is mapped onto the λ axis is a current that is unaffected by the change in the voltage phase φ.

According to the present embodiment, this current is used as a λ-axis current Iλ in the calculation for the preliminary modulation factor Mnf. Here, the angle θλ formed by the d axis and the λ axis, which is a parameter necessary for setting the λ axis, is expressed by an expression (eq10) below.

[Formula 10]

$$\theta\lambda = \alpha - \frac{\pi}{2} = \operatorname{Tan}^{-1}\left(\frac{Ld}{Lq}\tan\phi\right) - \frac{\pi}{2} \quad (eq10)$$

The λ axis setting unit 30n calculates the angle θλ formed by the d axis and the λ axis based on the expression (eq10) above.

A λ-axis command current calculating unit 30p (shown as an Iλ* calculating unit in FIG. 10) calculates a λ-axis command current Iλ* based on the command currents Id* and Ice outputted from the command current calculating unit 30e and the angle θλ outputted from the λ axis setting unit 30n, using an expression (eq11) below.

[Formula 11]

$$I\lambda^* = Id^* \cdot \cos\theta\lambda + Iq^* \cdot \sin\theta\lambda \quad (eq11)$$

Figure 14:
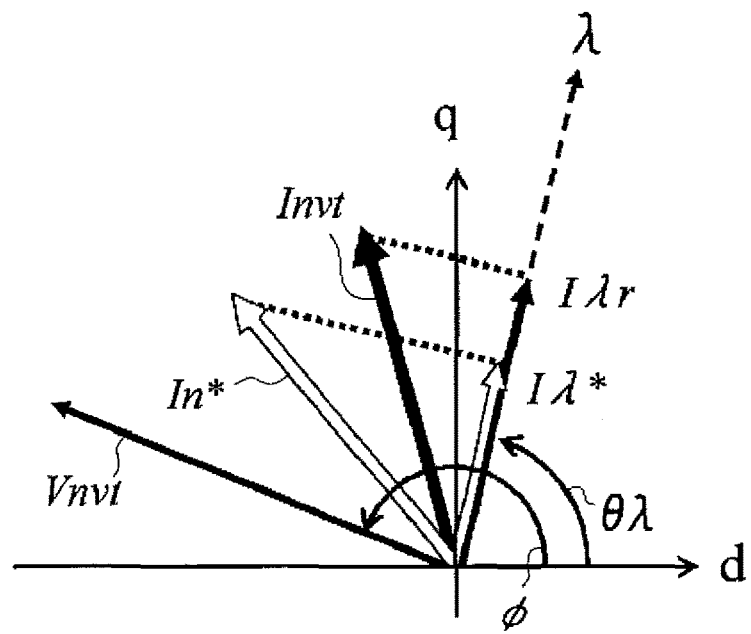
FIG. 14 is a diagram of a method for calculating a λ-axis current.

Here, in FIG. 14, a current command current vector is indicated by In*. A current current vector is indicated by Invt.

A λ-axis actual current calculating unit 30q (shown as an Iλr calculating unit in FIG. 10) calculates a λ-axis current Iλr based on the d- and q-axis currents Idr and Iqr outputted from the two-phase converting unit 30a and the angle θλ outputted from the λ axis setting unit 30n, using an expression (eq12) below.

[Formula 12]

$$I\lambda r = Idr \cdot \cos\theta\lambda + Iqr \cdot \sin\theta\lambda \quad (eq12)$$

A λ-axis current deviation calculating unit 30r calculates a λ-axis current deviation ΔIλ by subtracting the λ-axis current Iλr from the λ-axis command current Iλ*

A modulation factor calculating unit 30s (shown as a PI in FIG. 10) calculates the preliminary modulation factor Mnf based on the λ-axis current deviation ΔIλ. Specifically, the modulation factor calculating unit 30s first calculates the d-axis command voltage Vd* based on the λ-axis current deviation ΔIλ. The d-axis command voltage Vd* is a manipulated variable for performing feedback control to control the λ-axis current Iλr to the λ-axis command current Iλ*. According to the present embodiment, proportional-integral control is used as the feedback control. Subsequent processes performed by the modulation factor calculating unit 30s are identical to the processes performed by the modulation factor calculating unit 30h according to the above-described first embodiment.

A limiter 30t calculates the command modulation factor M* by performing a limiter process on the preliminary modulation factor Mnf outputted from the modulation factor calculating unit 30s Next, the steps in a switchover process according to the present embodiment will be described with reference FIG. 15. A switchover determining unit 30u of the control apparatus 30 repeatedly performs the switchover process at, for example, a predetermined interval.

Figure 16A:
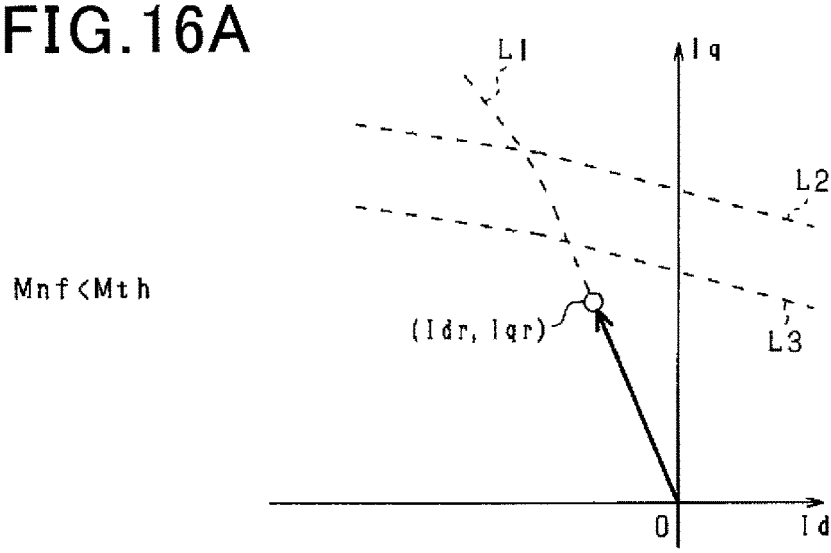
FIGS. 16A to 16C are diagrams of an overview of the switchover process.

In this series of processes, when determined that the first condition is not met at step S10, the switchover determining unit 30u proceeds to step S11. At step S11, the switchover determining unit 30u instructs the limiter 30t to not restrict the preliminary modulation factor Mnf. As a result, the limiter 30i outputs the inputted preliminary modulation factor Mnf as is, as the command modulation factor M*. In addition, at step S11, the switchover determining unit 30u instructs the modulator 30j to operate the switches of the inverter 20 based on overmodulation PWM control. As a result, both voltage phase φ and voltage amplitude Vn are operated. As shown in FIG. 16A, the actual current vector moves on the first line L1.

Figure 15:
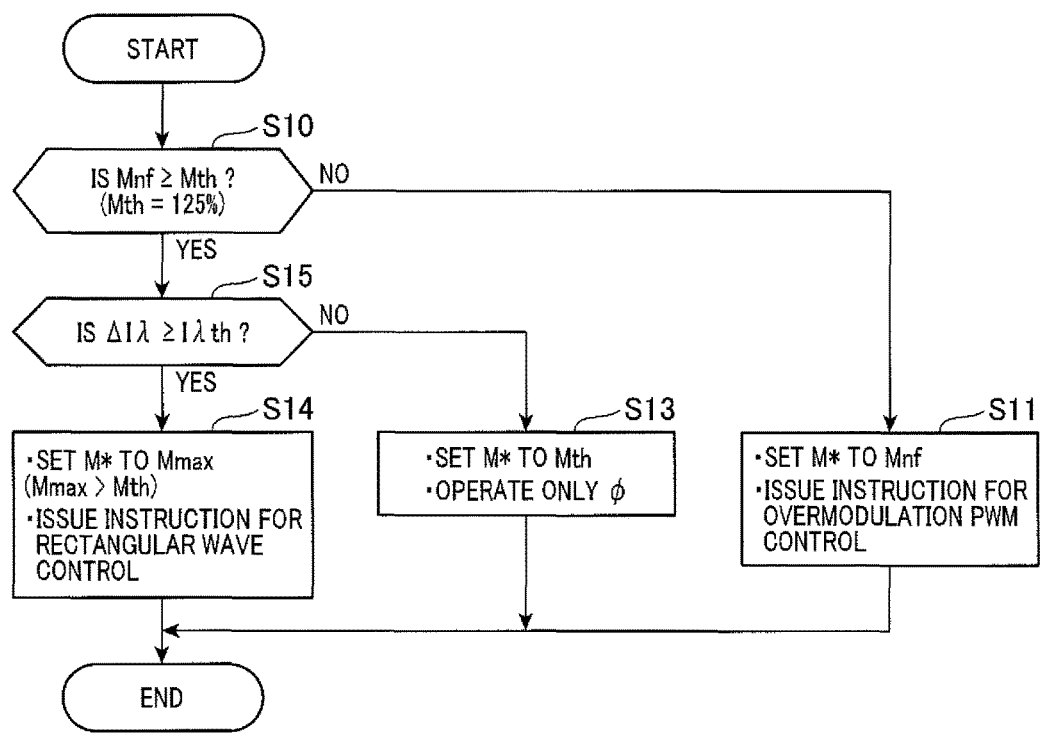
FIG. 15 is a flowchart of the steps in a switchover process.

Returning to the description of FIG. 15 given above, when determined that the first condition is met at step S10, the switchover determining unit 30U proceeds to step S15. The switchover determining unit 30U determines whether or not the λ-axis current deviation ΔIλ calculated by the λ-axis deviation calculating unit 30r is a λ-axis specified amount Iλth or greater. According to the present embodiment, this determination condition corresponds to a second condition. The λ-axis current deviation ΔIλ at this step corresponds to a current change amount that is the amount of change in the current flowing to the motor generator 10 in the λ-axis direction, after the first condition is met.

Figure 16B:
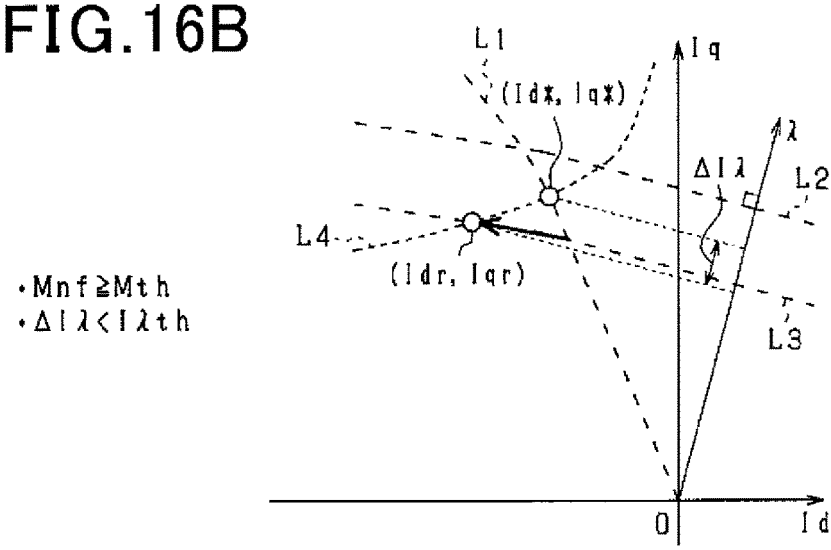

When determined that the second condition is not met at step S15, the switchover determining unit 30u proceeds to step S13. At step S13, the switchover determining unit 30u instructs the limiter 30t to fix the preliminary modulation factor Mnf at the determination modulation factor Mth. As a result, the limiter 30t outputs the determination modulation factor Mth as the command modulation factor M*, regardless of the value of the inputted preliminary modulation factor Mnf. In addition, at step S13, the switchover determining unit 30u instructs the modulator 30j to control the estimated torque Te to the command torque Trq* by operating only the voltage phase φ. As a result, as shown in FIG. 16B, the actual current vector moves on the third line L3.

According to the present embodiment, the λ-axis specified amount Iλth is set in a following manner. Specifically, with reference to FIG. 16C, an intersection between the first line L1 and the second line L2 is a first intersection. The λ-axis current Iλ corresponding to the first intersection is a first λ-axis current Iλ1. In addition, an intersection between the fourth line L4 that passes through the first intersection and the third line L3 is a second intersection. The λ-axis current Iλ corresponding to the second intersection is a second λ-axis current Iλ2. The λ-axis specified amount Iλth is set based on a maximum value of an absolute value of the difference between the first λ-axis current Iλ1 and the second λ-axis current Iλ2, within the ranges of the electrical angle velocity ω and the voltage amplitude Vn assumed possible when the motor generator 10 is driven. Specifically, for example, the above-described maximum value is set as the λ-axis specified amount Iλth. Alternatively, a value that is obtained by a margin greater than zero being added to the maximum value may be set as the λ-axis specified amount Iλth.

Figure 16C:
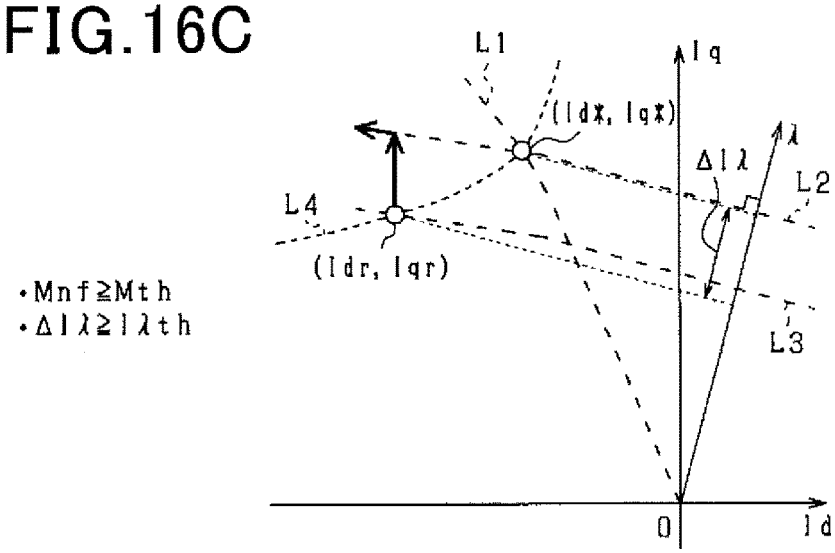

Returning to the description of FIG. 15 given above, when determined that the second condition is met at step S15, the switchover determining unit 30u proceeds to step S14. At step S14, the switchover determining unit 30u instructs the limiter 30t to fix the preliminary modulation factor Mnf at the maximum modulation factor Mmax. As a result, the limiter 30t outputs the maximum modulation factor Mmax as the command modulation factor M*, regardless of the value of the inputted preliminary modulation factor Mnf. In addition, at step S14, the switchover determining unit 30u instructs the modulator 30j to operate the switches of the inverter 20 based on rectangular wave control. As a result, as shown in FIG. 16C, the actual current vector moves on the second line L2.

Effects similar to those according to the above-described first embodiment can also be achieved by the present embodiment described above.

Other Embodiments

The above-described embodiments may be modified in the following manner.

According to the above-described embodiments, the preliminary modulation factor Mnf is used in the switchover from overmodulation PWM control to rectangular wave control. However, the present disclosure is not limited thereto. A preliminary voltage amplitude Vnf may be used. In this case, for example, the configuration according to the above-described first embodiment may be modified in the following manner.

Figure 2:
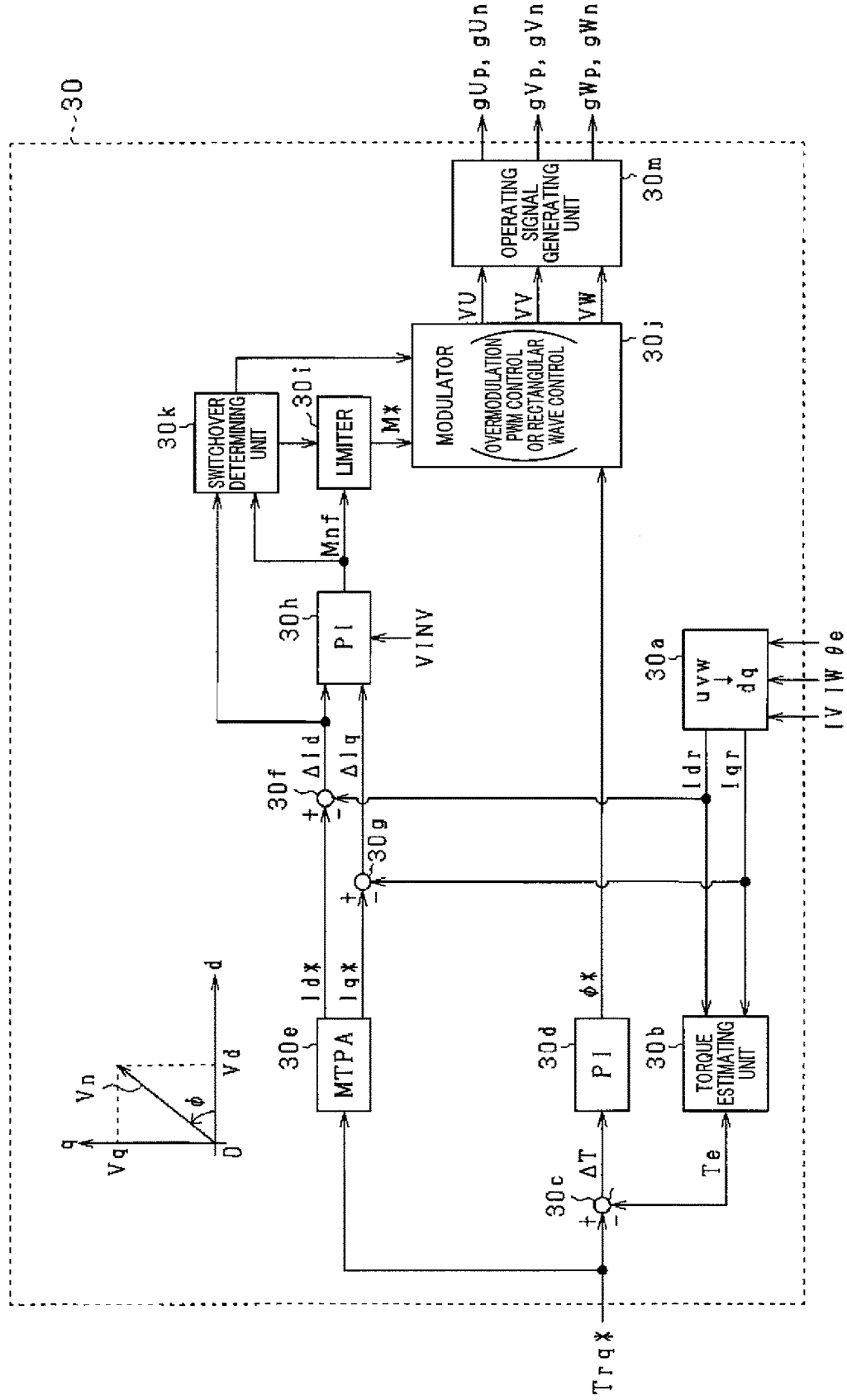
FIG. 2 is a block diagram of motor control.

Specifically, in FIG. 2, the modulation factor calculating unit 30h calculates the preliminary voltage amplitude Vnf and outputs the calculated preliminary voltage amplitude Vnf to the limiter 30i and the switchover determining unit 30k. The modulator 30j calculates the three phase voltages based on a command voltage amplitude V* and the command voltage phase ϕ* outputted from the limiter 30i. The modulator 30j then normalizes the calculated three phase voltages by the power supply voltage VINV and outputs the normalized three phase voltages to the operating signal generating unit 30m.

In addition, the process at step S10 in FIG. 6 is replaced with a process in which whether or not the preliminary voltage amplitude Vnf is a determination amplitude or greater is determined. Here, the determination amplitude corresponds to the voltage amplitude Vn calculated from the determination modulation factor Mth and the power supply voltage VINV based on the above-described expression (eq1).

In addition, at step S11, a process in which the limiter 30i is instructed to not restrict the preliminary voltage amplitude Vnf is performed. As a result, the limiter 30i outputs the inputted preliminary voltage amplitude Vnf as is, as the command voltage amplitude V*.

At step S13, a process in which the limiter 30i is instructed to fix the preliminary voltage amplitude Vnf at the determination amplitude is performed. As a result, the limiter 30i outputs the determination amplitude as the command voltage amplitude V*, regardless of the value of the inputted preliminary voltage amplitude Vnf.

At step S14, a process in which the limiter 30i is instructed to fix the preliminary voltage amplitude Vnf at a maximum voltage amplitude Vmax is performed. As a result, the limiter 30i outputs the maximum voltage amplitude Vmax as the command voltage amplitude V*, regardless of the value of the inputted preliminary voltage amplitude Vnf. The maximum voltage amplitude Vmax corresponds to a voltage amplitude Vn calculated from the maximum modulation factor Mmax and the power supply voltage VINV based on the above-described expression (eq1).

As a result of the above-described configuration, when both the first condition that the preliminary voltage amplitude Vnf increases and reaches the determination amplitude and the second condition that the d-axis current deviation ΔId after the first condition is met reaches the d-axis specified amount Idth are met, the control mode is switched from overmodulation PWM control to rectangular wave control.

According to the above-described embodiments, the determination modulation factor Mth is set to 125%. However, the present disclosure is not limited thereto. An arbitrary value can be set as long as the value is less than the modulation factor corresponding to rectangular wave control. For example, the determination modulation factor Mth may be set to a value that is less than 127% and 115% or greater. Here, 115% is a maximum value of the modulation factor at which the fundamental wave component included in the output voltage of the inverter 20 does not become distorted from the sinusoidal waveform, when third harmonic waves are superimposed on the three phase command voltages that are sine waves and the inverter 20 is operated by the operating signals being generated by three-phase modulation. In addition, 115% is the maximum value of the modulation factor at which the fundamental wave component included in the output voltage of the inverter 20 does not become distorted from the sinusoidal waveform, when the inverter 20 is operated by the operating signals being generated by two-phase modulation.

According to the above-described first embodiment, when the first condition is met and the second condition is not met, the voltage phase ϕ is operated while the command modulation factor M* is fixed at the determination modulation factor Mth. The estimated torque Te is thereby controlled to the command torque Trq*. However, the present disclosure is not limited thereto. For example, the following is also possible. Specifically, first, the determination modulation factor Mth is set to a value that is 115% or greater and less than 127%. Then, when the first condition is met and the second condition is not met, the voltage phase ϕ is operated, while the command modulation factor M* is allowed to move between the determination modulation factor Mth and 127%. The estimated torque Te is thereby controlled to the command torque Trq*.

According to the first embodiment, the d-axis specified amount Idth is set to a fixed value. However, the present disclosure is not limited thereto. For example, the d-axis specified amount Idth may be variably set based on the electrical angle velocity ω and the preliminary voltage amplitude Vnf. The electrical angle velocity ω may be calculated by a differential operation being performed on the electrical angle θe. The same similarly applies to the λ-angle specified amount Iλth according to the above-described second embodiment.

According to the above-described first and second embodiments, the d-axis specified amount Idth and the λ-angle specified amount Iλth are used for the determination of the first condition. However, the present disclosure is not limited thereto. A physical amount can be converted to the change amount in the negative d-axis direction and used for the determination of the first condition, as long as the physical amount has a correlation with either of the voltage amplitude and the modulation factor when the motor generator 10 is driven.

According to the above-described embodiments, the determination modulation factor Mth is a fixed value. However, the present disclosure is not limited thereto. For example, the determination modulation factor Mth may be set so as to have hysteresis, thereby preventing the determination regarding whether or not the first condition is met from being continuously performed as a result of minute changes in a controlled variable.

According to the above-described embodiments, the determination regarding whether or not the first condition is met and the determination regarding whether or not the second condition is met are immediately performed. However, the present disclosure is not limited thereto. For example, to prevent erroneous determination caused by a temporary disturbance, a time element may be added to the determination regarding whether or not the first condition is met and the determination regarding whether or not the second condition is met. The first condition and the second condition may each be determined to be met when a state in which the modulation factor exceeds a determination value and the change amount in the negative d-axis direction exceeds a predetermined amount continues for a predetermined amount of time.

The method by which the command current calculating unit 30e calculates the d- and q-axis command currents Id* and Iq* is not limited to the example according to the above-described first embodiment. For example, a current for actualizing maximum torque magnetic flux control at which an interlinkage flux is the smallest when identical torque is generated may be calculated as the d- and q-axis command currents Id* and Iq*.

According to the above-described first embodiment, the feedback control used by the modulation factor calculating unit 30h is not limited to proportional-integral control. For example, proportional-integral-differential control may be used.

The motor is not limited to a salient-pole machine and may be a non-salient pole machine, such as a surface permanent magnet synchronous motor (SPMSM). In addition, the motor is not limited to a permanent magnet type and may be a field winding type.

What is claimed is:

1. A control apparatus for a motor that is applied to a motor control system including an inverter that converts an output voltage of a direct-current power supply to an alternating-current voltage and outputs the alternating-current voltage, and a motor that is driven by the alternating-current voltage outputted from the inverter, the control apparatus comprising:
   an overmodulation operating unit that operates the inverter by overmodulation pulse width modulation control to control an output torque of the motor to a command torque;
   a rectangular wave operating unit that operates the inverter by rectangular wave control to control the output torque of the motor to the command torque; and
   a switching unit that:
      operates the inverter by the overmodulation pulse width modulation control, when a first condition is not met, the first condition being defined as a condition that an amplitude parameter increases and reaches a determination value, the amplitude parameter being defined as either of an amplitude of an output voltage vector of the inverter and a modulation factor of the output voltage of the inverter; and
      switches operation of the inverter from operation by the overmodulation operating unit to operation by the rectangular wave operating unit, when both the first condition and a second condition are met, the second condition being defined as a condition that a change amount in a negative d-axis direction of a current vector of a current flowing to the motor after the first condition is met reaches a predetermined amount.

2. The control apparatus according to claim 1, wherein:
the switching unit controls the output torque of the motor to the command torque by controlling a phase of the output voltage vector while fixing the amplitude parameter to the determination value, when the first condition is met and the second condition is not met.

3. The control apparatus according to claim 1, further comprising:
   a command current calculating unit that calculates a command current of the motor based on the command torque; and
   a parameter calculating unit that calculates the amplitude parameter as a manipulated variable for performing feedback control to control an actual current flowing to the motor to the command current,
   the switching unit using the amplitude parameter calculated by the parameter calculating unit to determine whether or not the first condition is met.

4. The control apparatus according to claim 2, further comprising:
   a command current calculating unit that calculates a command current of the motor based on the command torque; and
   a parameter calculating unit that calculates the amplitude parameter as a manipulated variable for performing feedback control to control an actual current flowing to the motor to the command current,
   the switching unit using the amplitude parameter calculated by the parameter calculating unit to determine whether or not the first condition is met.

5. The control apparatus according to claim 1, further comprising:
   a current change amount calculating unit that calculates a current change amount in a non-interfering axis direction of the current flowing to the motor after the first condition is met,
   the non-interfering axis being defined as a coordinate axis that is non-interfering with a change in the current vector of the current flowing to the motor in relation to a change in the phase of the output voltage vector on a dq-axis coordinate system of the motor,
   the second condition being defined as a condition that the current change amount in the non-interfering axis direction calculated by the current change amount calculating unit reaches a specified amount.

6. The control apparatus according to claim 2, further comprising:
   a current change amount calculating unit that calculates a current change amount in a non-interfering axis direction of the current flowing to the motor after the first condition is met,
   the non-interfering axis being defined as a coordinate axis that is non-interfering with a change in the current vector of the current flowing to the motor in relation to a change in the phase of the output voltage vector on a dq-axis coordinate system of the motor,
   the second condition being defined as a condition that the current change amount in the non-interfering axis direction calculated by the current change amount calculating unit reaches a specified amount.

7. The control apparatus according to claim 3, further comprising:
   a current change amount calculating unit that calculates a current change amount in a non-interfering axis direction of the current flowing to the motor after the first condition is met,
   the non-interfering axis being defined as a coordinate axis that is non-interfering with a change in the current vector of the current flowing to the motor in relation to a change in the phase of the output voltage vector on a dq-axis coordinate system of the motor,
   the second condition being defined as a condition that the current change amount in the non-interfering axis direction calculated by the current change amount calculating unit reaches a specified amount.

8. The control apparatus according to claim 4, further comprising:
   a current change amount calculating unit that calculates a current change amount in a non-interfering axis direction of the current flowing to the motor after the first condition is met, the non-interfering axis being defined as a coordinate axis that is non-interfering with a change in the current vector of the current flowing to the motor in relation to a change in the phase of the output voltage vector on a dq-axis coordinate system of the motor, the second condition being defined as a condition that the current change amount in the non-interfering axis direction calculated by the current change amount calculating unit reaches a specified amount.

9. The control apparatus according to claim 1, further comprising:
a current change amount calculating unit that calculates a current change amount in a d-axis direction of the current flowing to the motor after the first condition is met,
the second condition being defined as a condition that the current change amount in the d-axis direction calculated by the current change amount calculating unit reaches a specified amount.

10. The control apparatus according to claim 2, further comprising:
a current change amount calculating unit that calculates a current change amount in a d-axis direction of the current flowing to the motor after the first condition is met,
the second condition being defined as a condition that the current change amount in the d-axis direction calculated by the current change amount calculating unit reaches a specified amount.

11. The control apparatus according to claim 3, further comprising:
a current change amount calculating unit that calculates a current change amount in a d-axis direction of the current flowing to the motor after the first condition is met,
the second condition being defined as a condition that the current change amount in the d-axis direction calculated by the current change amount calculating unit reaches a specified amount.

12. The control apparatus according to claim 4, further comprising:
a current change amount calculating unit that calculates a current change amount in a d-axis direction of the current flowing to the motor after the first condition is met,
the second condition being defined as a condition that the current change amount in the d-axis direction calculated by the current change amount calculating unit reaches a specified amount.

13. A motor control system comprising:
an inverter that converts an output voltage of a direct-current power supply to an alternating-current voltage and outputs the alternating-current voltage;
a motor that is driven by the alternating-current voltage outputted from the inverter; and
a control apparatus comprising:
an overmodulation operating unit that operates the inverter by overmodulation pulse width modulation control to control an output torque of the motor to a command torque;
a rectangular wave operating unit that operates the inverter by rectangular wave control to control the output torque of the motor to the command torque; and
a switching unit that:
operates the inverter by the overmodulation pulse width modulation control, when a first condition is not met, the first condition being defined as a condition that an amplitude parameter increases and reaches a determination value, the amplitude parameter being defined as either of an amplitude of an output voltage vector of the inverter and a modulation factor of the output voltage of the inverter; and
switches operation of the inverter from operation by the overmodulation operating unit to operation by the rectangular wave operating unit, when both the first condition and a second condition are met, the second condition being defined as a condition that a change amount in a negative d-axis direction of a current vector of a current flowing to the motor after the first condition is met reaches a predetermined amount.

14. A control method for a motor that is applied to a motor control system including an inverter that converts an output voltage of a direct-current power supply to an alternating-current voltage and outputs the alternating-current voltage, and a motor that is driven by the alternating-current voltage outputted from the inverter, the control method comprising:
operating the inverter by overmodulation pulse width modulation control to control an output torque of the motor to a command torque;
operating the inverter by rectangular wave control to control the output torque of the motor to the command torque;
operating the inverter by overmodulation pulse width modulation control, when a first condition is not met, the first condition being defined as a condition that an amplitude parameter increases and reaches a determination value, the amplitude parameter being defined as either of an amplitude of an output voltage vector of the inverter and a modulation factor of the output voltage of the inverter; and
switching operation of the inverter from operation by the overmodulation pulse width modulation control to operation by the rectangular wave control, when both the first condition and a second condition are met, the second condition being defined as a condition that a change amount in a negative d-axis direction of a current vector of a current flowing to the motor after the first condition is met reaches a predetermined amount.

* * * * *